(12) United States Patent
Chen et al.

(10) Patent No.: US 7,624,119 B2
(45) Date of Patent: Nov. 24, 2009

(54) LOW-OVERHEAD BUILT-IN TIMESTAMP COLUMN FOR RELATIONAL DATABASE SYSTEMS

(75) Inventors: Yao-Ching Stephen Chen, Saratoga, CA (US); Curt L. Cotner, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 10/777,604

(22) Filed: Feb. 11, 2004

(65) Prior Publication Data

US 2005/0177590 A1 Aug. 11, 2005

(51) Int. Cl.
*G06F 17/00* (2006.01)
(52) U.S. Cl. .......................................... 707/102; 707/3
(58) Field of Classification Search .................. 707/2–3, 707/7–8, 100–101, 201–203
See application file for complete search history.

(56) References Cited

U.S. PATENT DOCUMENTS

| | | | |
|---|---|---|---|
| 5,721,915 A * | 2/1998 | Sockut et al. ............... | 707/200 |
| 5,778,350 A | 7/1998 | Adams et al. | |
| 5,778,354 A | 7/1998 | Leslie et al. | |
| 5,812,840 A * | 9/1998 | Shwartz ......................... | 707/4 |
| 6,094,649 A | 7/2000 | Bowen et al. | |
| 6,363,389 B1 | 3/2002 | Lyle et al. | |
| 6,874,001 B2 * | 3/2005 | Narang et al. ................ | 707/203 |
| 6,882,994 B2 * | 4/2005 | Yoshimura et al. .............. | 707/3 |
| 6,957,221 B1 * | 10/2005 | Hart et al. .................... | 707/100 |
| 6,996,583 B2 * | 2/2006 | Wilmot ....................... | 707/201 |
| 6,999,977 B1 * | 2/2006 | Norcott et al. ............... | 707/203 |
| 2001/0016844 A1 | 8/2001 | Isip, Jr. | |
| 2001/0051939 A1 | 12/2001 | Yoshimura et al. | |
| 2003/0105732 A1 | 6/2003 | Kagalwala et al. | |

\* cited by examiner

*Primary Examiner*—Sathyanarayan Pannala
(74) *Attorney, Agent, or Firm*—Sawyer Law Group PC

(57) ABSTRACT

A method for providing a timestamp for data in a database system, in which the database system operates in accordance with a database schema. The method includes providing a hidden timestamp column in a table in the database system, in which the hidden timestamp column includes a timestamp value for each row of data in the table. The timestamp value indicates a last time a corresponding row of data in the table was previously modified. The hidden timestamp column does not appear in the database schema by default and exposes the timestamp value for a given row of data in the table only to a query that calls the timestamp column by name.

2 Claims, 2 Drawing Sheets

LOW-OVERHEAD BUILT-IN TIMESTAMP COLUMN FOR RELATIONAL DATABASE SYSTEMS

FIELD OF THE INVENTION

The present invention relates to database systems, and more particularly to providing timestamps in database systems.

BACKGROUND OF THE INVENTION

The need for data replication in a database system, particularly a distributed database system, is well known in the art. To ensure data consistency, modifications to different copies of a table must be replicated across all copies. To facilitate the updating of the table copies, timestamps are typically used to indicate which rows have been modified since the last update. Conventionally, a timestamp column that is automatically updated each time a row is modified is provided for this purpose. If the timestamp value in the timestamp column is later than the time of the last update, then that row has been modified since the last update.

Applications commonly use this timestamp column for controlling optimistic locking schemes as follows: the application retrieves one or more rows from the table, including the timestamp column; the application logically or physically disconnects from the database system; the application makes updates to the rows that were retrieved from the database; and sometime later, the application reconnects to the database so that it can record the updates in the database.

Before sending each update, the application retrieves the row from the database to validate that the timestamp column has not changed since the data was originally retrieved. If the timestamp column is unchanged, the application can safely record the update for that row. If the timestamp column is not the same, the disconnected update fails, and the application has to re-drive the update process using the modified data row.

As disconnected update models become more pervasive, the value of having an automatically updated timestamp column is growing. However, the addition of a timestamp column has several drawbacks. First, it requires additional CPU cost to maintain the timestamp column in each data row. Second, some tables may not be updated very frequently, so it may not be worthwhile to require the additional space for the timestamp in every row. Third, if the timestamp column has to be explicitly added to the table by the user, shrink-wrapped client applications cannot assume that the timestamp column will necessarily be present, since the user may have chosen not to add the timestamp column. So, client applications will be reluctant to exploit this feature of the database. Fourth, having an explicit column for the timestamp is also inconvenient for cases where some applications need the extra column while others do not. For example, adding the extra timestamp column for one application might cause problems for other existing applications that didn't expect this extra column to be part of the table schema.

Accordingly, there exists a need for an improved automatically updated timestamp for database systems. The improved timestamp should require low overhead, be available for all tables in a database system, and avoid problems for applications that do not expect a timestamp column. The present invention addresses such a need.

SUMMARY OF THE INVENTION

An improved automatically updated timestamp for database systems is disclosed. The automatically updated timestamp can be provided in a hidden timestamp column for a table, where the value of the timestamp column can be retrieved with a query that calls the column by name. Optionally, the timestamp column can be provided for each table in the database system to ensure its availability to applications. For cases where a timestamp for each row in a table is not desired, an automatically updated timestamp can be provided for a data page. This timestamp can be retrieved from an update timestamp recorded on disk and in the buffer pool or from a log relative byte address. Although this is a page-level timestamp, its use may be desirable for infrequently updated tables or where space on the disk and buffer pool is at a premium.

DETAILED DESCRIPTION

The present invention provides an improved automatically updated timestamp for database systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 1 and 2 in conjunction with the discussion below.

Figure 1:
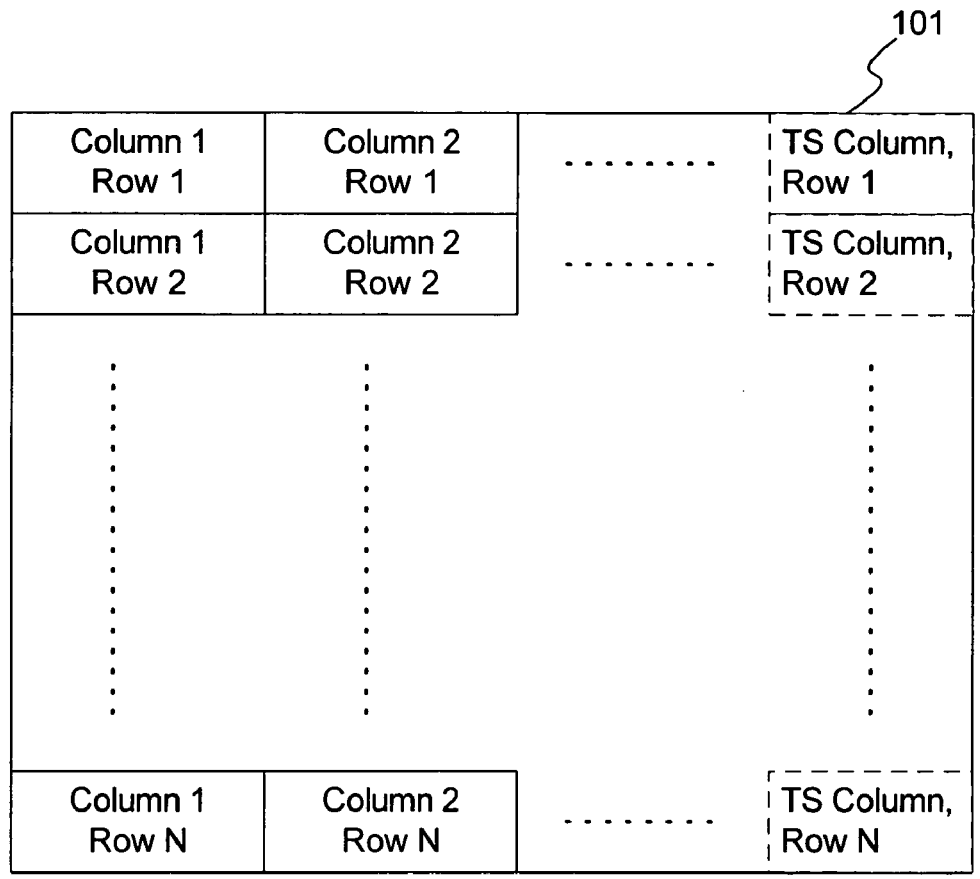
FIG. 1 illustrates a first preferred embodiment of an automatically updated timestamp for database systems in accordance with the present invention.
Figure 2:
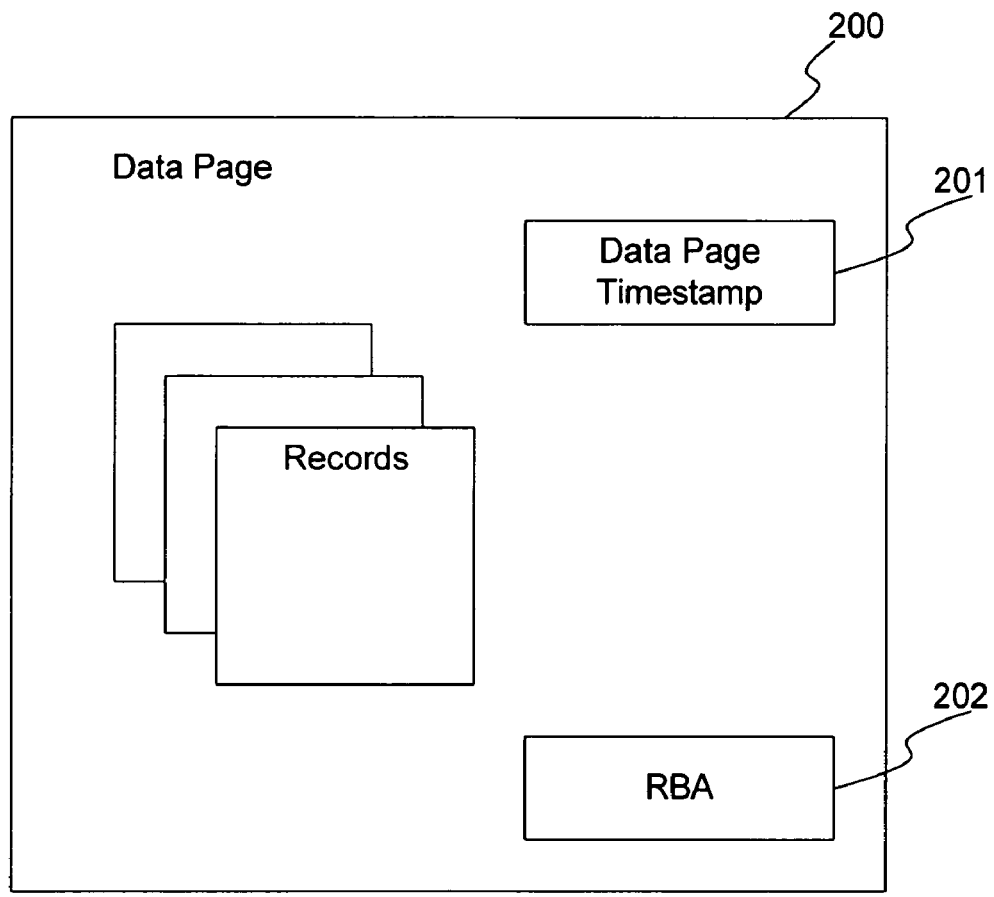
FIG. 2 illustrates a second preferred embodiment of an automatically updated timestamp for database systems in accordance with the present invention.

FIG. 1 illustrates a first preferred embodiment of an automatically updated timestamp for database systems in accordance with the present invention. In the first preferred embodiment, a built-in hidden timestamp column 101 is provided for each table in the database system that contains an automatically updated timestamp. The timestamp column 101 is automatically updated with the last time that its corresponding row was modified. The timestamp column 101 is "hidden" in that it does not appear in the database schema by default. Application programs can specifically request that the timestamp column 101 be returned by issuing a query which calls the timestamp column 101 by name. This allows the value of the timestamp column 101 to be returned when required but avoids exposing the column 101 to queries that do not call it by name. Thus, the timestamp column 101 does not show up in queries by applications that have no need for this column. This also allows the database administrator to add the timestamp column 101 to an existing table without worrying that the new column 101 will cause problems for existing application programs that do not expect the column to be present.

Optionally, in order to ensure that applications can depend upon the automatically updated timestamp being present, the hidden timestamp column 101 can be made available for all tables in the database system as a default. This avoids situations where the customer neglects to add the extra timestamp column 101 to a given table. However, in some cases the customer may not want to expend the CPU time or the disk space/buffer pool space required to have an automatically updated timestamp column on every row in every table. In these cases, it can be left to the customer to explicitly add the hidden timestamp column.

Alternatively, the database system can obtain the value of the timestamp in other ways. FIG. 2 illustrates a second preferred embodiment of an automatically updated timestamp for database systems in accordance with the present invention. In the second preferred embodiment, the database system obtains an automatically updated timestamp from the data page 200. This can be accomplished in one of two ways. In some cases, an update timestamp 201 is available in the data page 200 that is recorded on disk or in the buffer pool. This update timestamp 201 can be used to indicate the last time one of the rows in the data page was modified. In the remaining cases, the database system will have a log relative byte address (RBA) 202 associated with the last update to the data page 200. The RBA value 202 can be converted to a timestamp by taking periodic timestamp values and associating those values with the matching log RBA value. Given those periodic values, the timestamp for any given RBA value can be calculated by interpolating between the nearest periodic log RBA timestamps.

Customers that choose to not create a timestamp column for a given table will still have the functional ability to retrieve a timestamp to determine if a row in the data page 200 has been changed or not. Since the timestamp is associated with the data page 200 rather than a single row, this timestamp will provide less granularity than the timestamp column 101 in the first preferred embodiment. However, this lesser granularity may be acceptable for tables that are updated infrequently. Therefore, the customer is given the flexibility to chose between using the hidden timestamp column 101 or the page-level timestamp 201/202. In addition, the customer may choose to use the hidden timestamp column for one table, while using the page-level timestamp for another table.

An improved automatically updated timestamp for database systems has been disclosed. The automatically updated timestamp can be provided in a hidden timestamp column for a table, where the value of the timestamp column can be retrieved with a query that calls the column by name. Optionally, the timestamp column can be provided for each table in the database system to ensure its availability to applications. For cases where a timestamp for each row in a table is not desired, an automatically updated timestamp can be provided for a data page. This timestamp can be retrieved from an update timestamp recorded on disk and in the buffer pool or from a log relative byte address. Although this is a page-level timestamp, its use may be desirable for infrequently updated tables or where space on the disk and buffer pool is at a premium.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer processor implemented method for providing a timestamp for data in a database system, the database system operating in accordance with a database schema, the computer processor performing the following method steps:

providing a table in the database system, the table including a plurality of rows of data;

providing a hidden timestamp column in the table of the database system, the hidden timestamp column including a timestamp value for each row of data in the table, the timestamp value indicating a last time a corresponding row of data in the table was previously modified, wherein the hidden timestamp column does not appear in the database schema by default and exposes the timestamp value for a given row of data in the table only to a query that calls the timestamp column by name;

receiving a query from an application to obtain a timestamp value from the hidden timestamp column, the query calling the timestamp column by name; and in response to the query, the hidden timestamp column returning the timestamp value to the application for use by the application, wherein the application uses the returned timestamp value for controlling a locking scheme associated with recording data updates in the database system.

2. The method of claim 1, wherein the timestamp value corresponding to a given row of data in the table is automatically updated each time data in the given row has been modified.

* * * * *

UNITED STATES PATENT AND TRADEMARK OFFICE
CERTIFICATE OF CORRECTION

PATENT NO.         : 7,624,119 B2                                                                 Page 1 of 1
APPLICATION NO. : 10/777604
DATED              : November 24, 2009
INVENTOR(S)        : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 393 days.

Signed and Sealed this

Twenty-sixth Day of October, 2010

David J. Kappos
*Director of the United States Patent and Trademark Office*